United States Patent [19]

Sodeyama

[11] Patent Number: 5,764,452
[45] Date of Patent: Jun. 9, 1998

[54] MAGNETIC HEAD INCLUDING MAGNETIC CORE IN WHICH A PLURALITY OF CORE ELEMENTS ARE LAMINATED

[75] Inventor: Masakazu Sodeyama, Saitama-ken, Japan

[73] Assignee: Canon Kabushiki Kaisha, Tokyo, Japan

[21] Appl. No.: 417,373

[22] Filed: Apr. 5, 1995

[30] Foreign Application Priority Data

Apr. 11, 1994 [JP] Japan ................. 6-072031

[51] Int. Cl.$^6$ ................................................. G11B 5/147
[52] U.S. Cl. ........................................ 360/126; 360/125
[58] Field of Search ................................ 360/126, 125, 360/122, 110

[56] References Cited

U.S. PATENT DOCUMENTS

| | | | |
|---|---|---|---|
| 3,175,049 | 3/1965 | Gabor | 360/126 |
| 3,417,465 | 12/1968 | Glass | 360/126 X |
| 4,227,225 | 10/1980 | Nishikawa | 360/126 X |
| 4,899,241 | 2/1990 | Miyakawa et al. | 360/125 |
| 5,012,375 | 4/1991 | Nishimura | 360/126 X |
| 5,029,380 | 7/1991 | Smukal | 360/126 |
| 5,057,957 | 10/1991 | Ito et al. | 360/125 X |

Primary Examiner—Stuart S. Levy
Assistant Examiner—William R. Korzuch
Attorney, Agent, or Firm—Robin, Blecker & Daley

[57] ABSTRACT

A magnetic head comprises a magnetic core including core halves joined together, and each of the core halves includes a plurality of core elements in laminated form. Each of the core halves has a plurality of L-shaped core elements each provided with a first base portion and a second base portion which constitute an approximately L-like shape, and an I-shaped core element provided between the L-shaped core elements. The I-shaped core element is interposed between the first base portions of the respective L-shaped core elements, and the L-shaped core elements are jointed together at their second base portions.

17 Claims, 6 Drawing Sheets

FIG.1(a) (PRIOR ART)
FIG.1(b) (PRIOR ART)
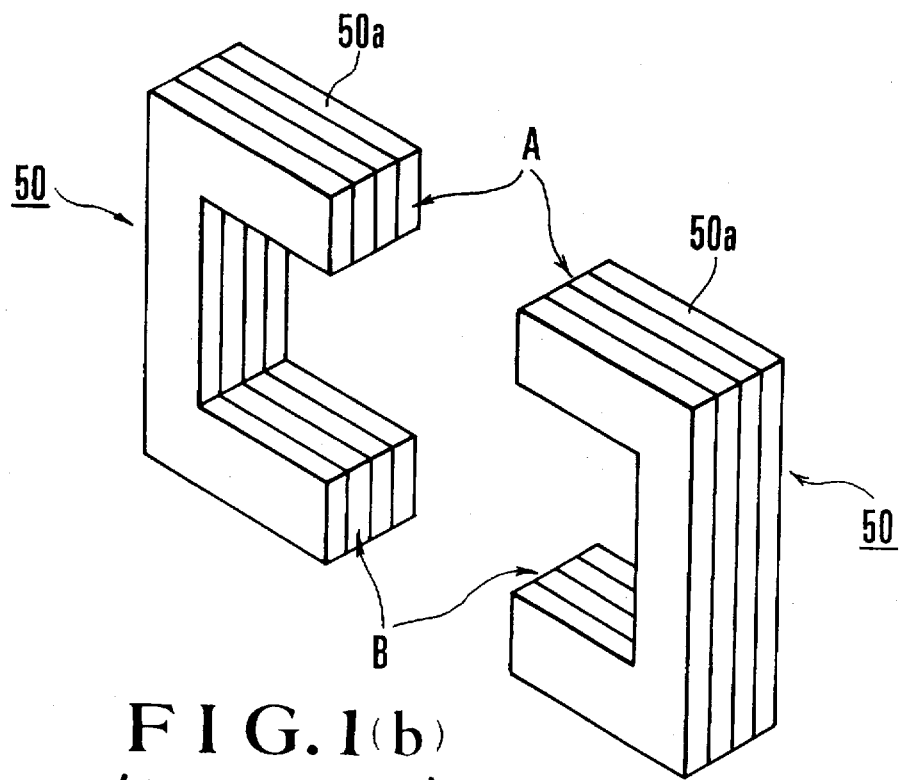
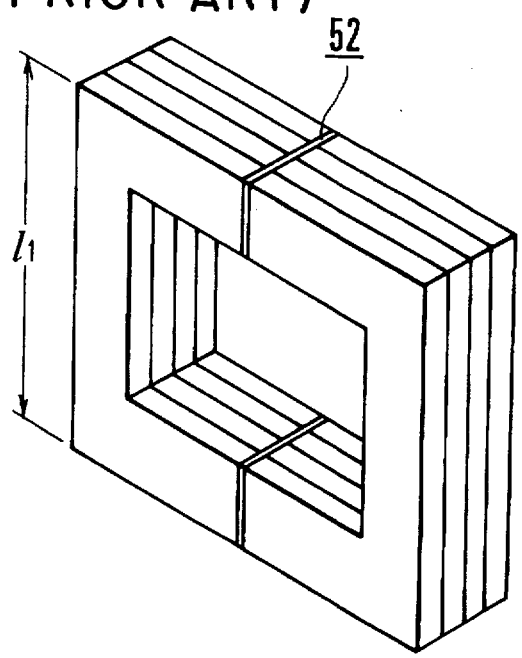

MAGNETIC HEAD INCLUDING MAGNETIC CORE IN WHICH A PLURALITY OF CORE ELEMENTS ARE LAMINATED

BACKGROUND OF THE INVENTION

1. Field of the Invention

The present invention relates to a magnetic head and, more particularly, to the arrangement and construction of a magnetic core for the magnetic head.

2. Description of the Related Art

FIG. 1(a) shows the arrangement and construction of conventional magnetic core halves (hereinafter referred to as the core halves) for a magnetic head. Each magnetic core half 50 includes a plurality of core elements 50a in laminated form, and each of the core elements 50a has a C-like shape as shown in FIG. 1(a). The magnetic core halves 50 are joined together at their opposed ends A and B, whereby a magnetic core 52 is formed as shown in FIG. 1(b).

Such a magnetic core may be formed in a bent shape, as required. If the magnetic core 52 shown in FIG. 1(b) is formed in the shape of the magnetic core 54 shown in FIG. 2(a), it is possible to reduce the length of the magnetic core 52 in the gap-depth direction thereof, i.e., $l_2 < l_1$ can be obtained. Either core half of the magnetic core 54 is made up of core elements 60a, 60b and 60c as shown in FIG. 2(b). The respective core elements 60a, 60b and 60c have shapes bent at predetermined positions $C_1$, $C_2$ and $C_3$. The core elements 60a, 60b and 60c are laminated to constitute a core half 60, and a coil (not shown) is wound around the core half 60. The core half 60 and another core half (not shown) are joined-together to constitute the magnetic core 54 for a magnetic head.

Although it is desired to reduce the size of a magnetic head using core halves of shape similar to that of the core half 60 shown in FIG. 2(b), means for achieving such size reduction has not yet been provided.

SUMMARY OF THE INVENTION

It is, therefore, an object of the present invention to reduce the size of a magnetic head which comprises a magnetic core including core halves joined together, each of the core halves including a plurality of core elements in laminated form.

To solve the above-described problem and to achieve the above object, according to one aspect of the present invention, there is provided a magnetic head which comprises a magnetic core including core halves joined together, each of the core halves including a plurality of core elements in laminated form. Each of the core halves has a plurality of L-shaped core elements each provided with a first base portion and a second base portion which constitute an approximately L-like shape, and an I-shaped core element provided between the L-shaped core elements. The I-shaped core element is interposed between the first base portions of the respective L-shaped core elements, and the L-shaped core elements are jointed together at their second base portions.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIGS. 1(a) and 1(b) are schematic perspective views showing a general related-art example of a core half including laminated core elements;

DETAILED DESCRIPTION OF THE PREFERRED EMBODIMENT

A preferred embodiment of the present invention will be described below in detail with reference to the accompanying drawings.

Figure 2A:
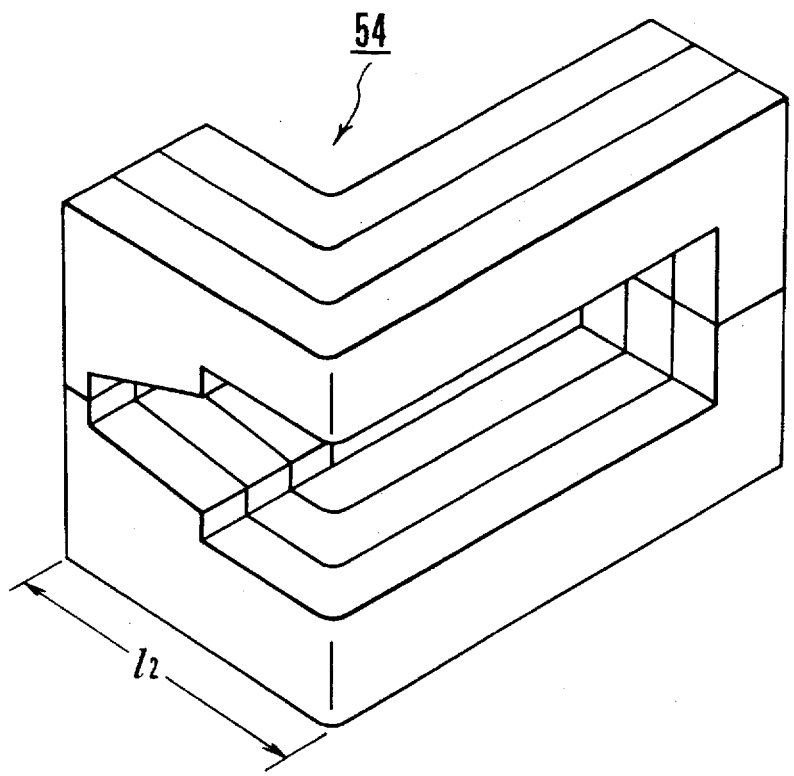
FIGS. 2(a) and 2(b) are schematic perspective views showing an improved related-art example.
Figure 2B:
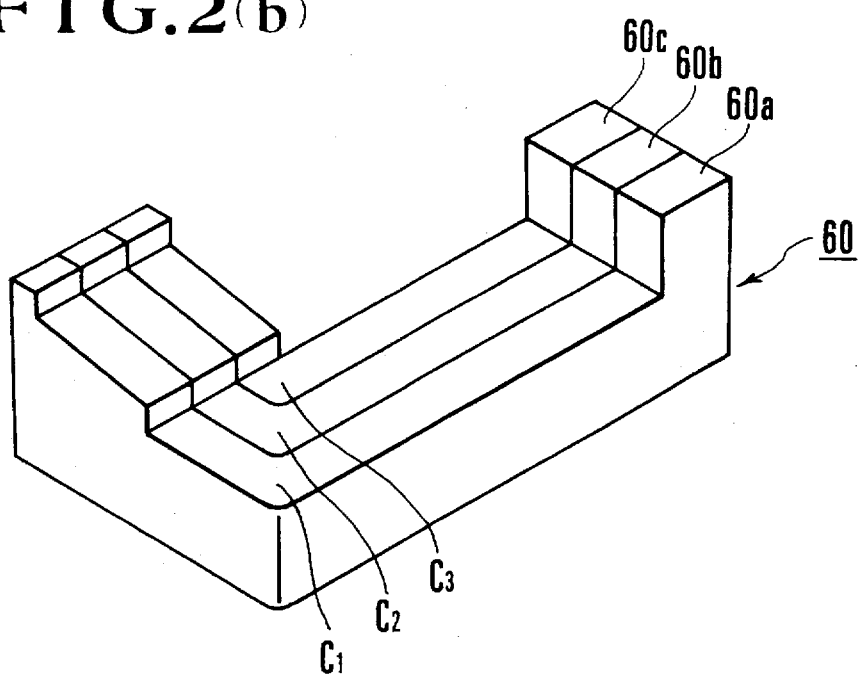
Figure 3:
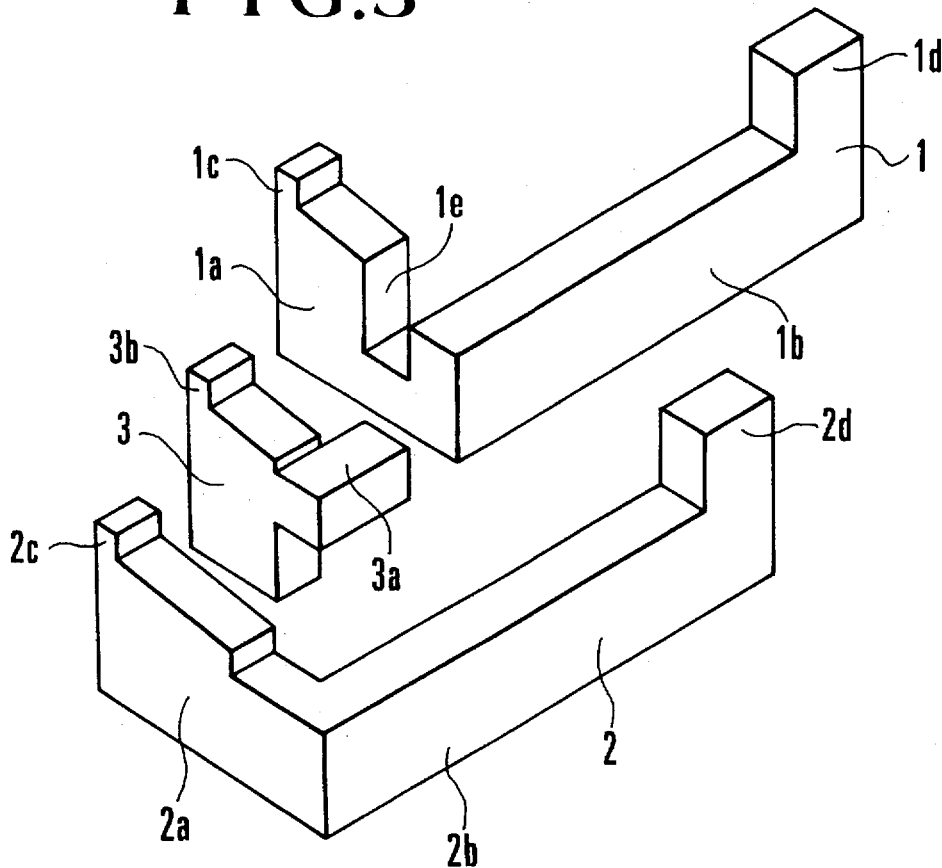
FIG. 3 is a schematic perspective view showing in exploded form core elements which constitute a core half according to an embodiment of the present invention.

FIG. 3 is a perspective view showing core elements which constitute a core half according to the preferred embodiment of the present invention. Each of the core elements is made of a ferromagnetic material such as Permalloy which is a nickel-iron alloy.

Core elements 1 and 2 respectively have bent portions 1a and 2a as their first base portions and coil winding portions 1b and 2b as their second base portions. Each of the core elements 1 and 2 has an approximately L-like shape as viewed in top plan in FIG. 3. The first and second base portions of the core element 1 have projections 1c and 1d at their respective extending ends, while the first and second base portions of the core element 2 have projections 2c and 2d at their respective extending ends. As shown in FIG. 5(a), a coil bobbin 4 around which a coil 5 is wound is fitted onto the coil winding portions 1b and 2b (which are collectively indicated by reference numeral 10c in FIG. 4). The coil bobbin 4 is positioned so as not to project from joining faces 10a and 10b of a core half 10.

Referring back to FIG. 3, a core element 3 has an approximately I-like shape as viewed in top plan in FIG. 3, and has an engaging projection 3a, which serves as an engaging portion, and a projection 3b. The engaging projection 3a is brought into engagement with an engaging groove 1e which is formed in the core element 1 as a portion with which to engage the engaging projection 3a.

Figure 4:
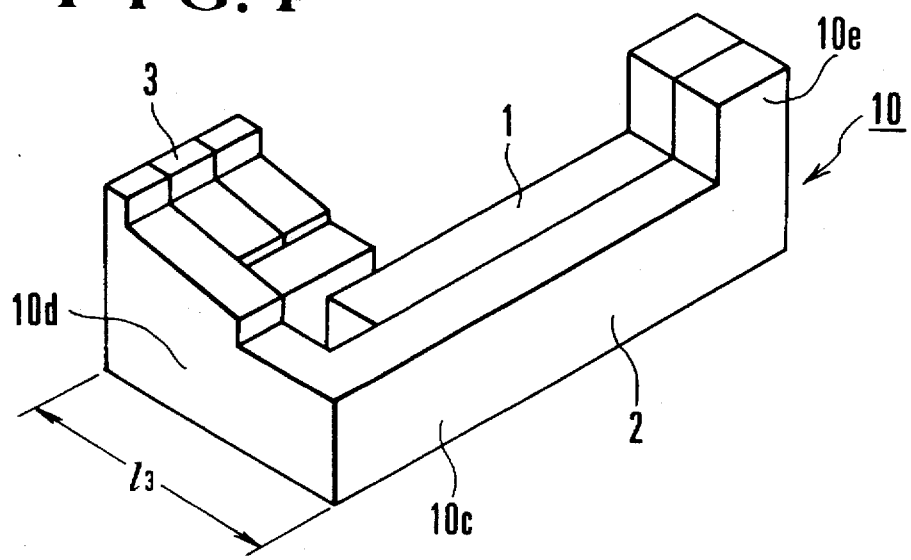
FIG. 4 is a schematic perspective view showing the core half in laminated form.
Figure 5A:
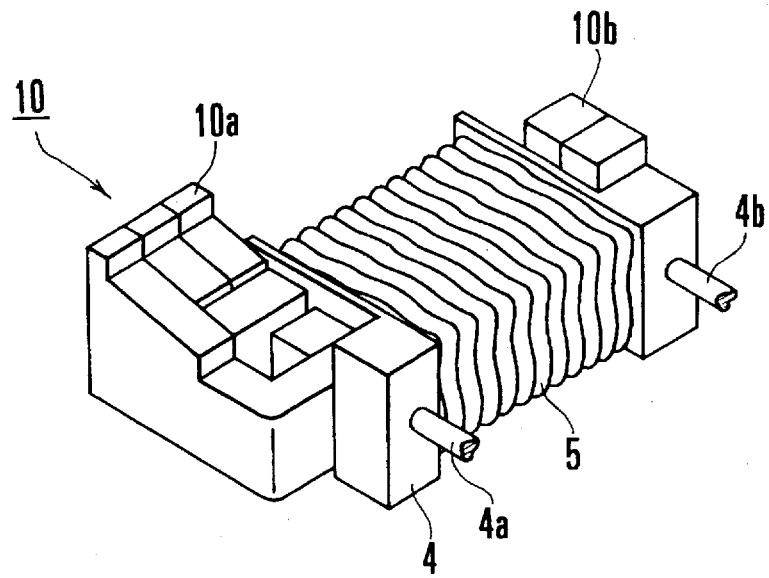
FIGS. 5(a) and 5(b) are schematic perspective views showing core halves each having a wound coil.

The core half 10 which is laminated as shown in FIG. 4 is prepared by engaging the engaging projection 3a of the core element 3 with the engaging groove 1e of the core element 1, causing the core element 1 to abut on the core element 2 at their second base portions 1b and 2b, and applying and hardening an epoxy-base adhesive. As can be seen from FIG. 4, according to the present embodiment, since the engaging projection 3a is engaged with the engaging groove 1e formed in the core element 1, the core element 3 having no coil winding portion is prevented from easily coming away from the core half 10 which is a laminate of the core elements 1, 2 and 3.

Then, as shown in FIG. 5(a), the coil bobbin 4 is fitted onto the core half 10 by inserting the coil winding portion 10c (refer to FIG. 4) of the core half 10 into the coil bobbin 4 through an opening (not shown) formed at one end thereof. Then, by winding the coil 5 around the coil bobbin 4, the core half 10 around which the coil 5 is wound is obtained. Incidentally, the coil bobbin 4 has terminal conductors 4a and 4b through which to conduct signals to the outside. The opposite ends of the coil 5 are respectively connected to the terminal conductors 4a and 4b, as by soldering.

A magnetic core is formed by joining the core half 10 to the coil half 20 shown in FIG. 5(b), as will be described later in more detail. The coil half 20 includes core elements 11, 12 and 13 which are formed symmetrically to the core elements 1, 2 and 3, respectively. Since the respective core elements 11, 12 and 13 are merely symmetrical in shape to the core elements 1, 2 and 3, the description of the same is omitted. The coil winding portion (not shown) of the coil half 20 has a shape identical to the coil winding portion 10c of the core half 10, so that a coil bobbin of the same shape can be used as the coil bobbin 4.

Figure 6:
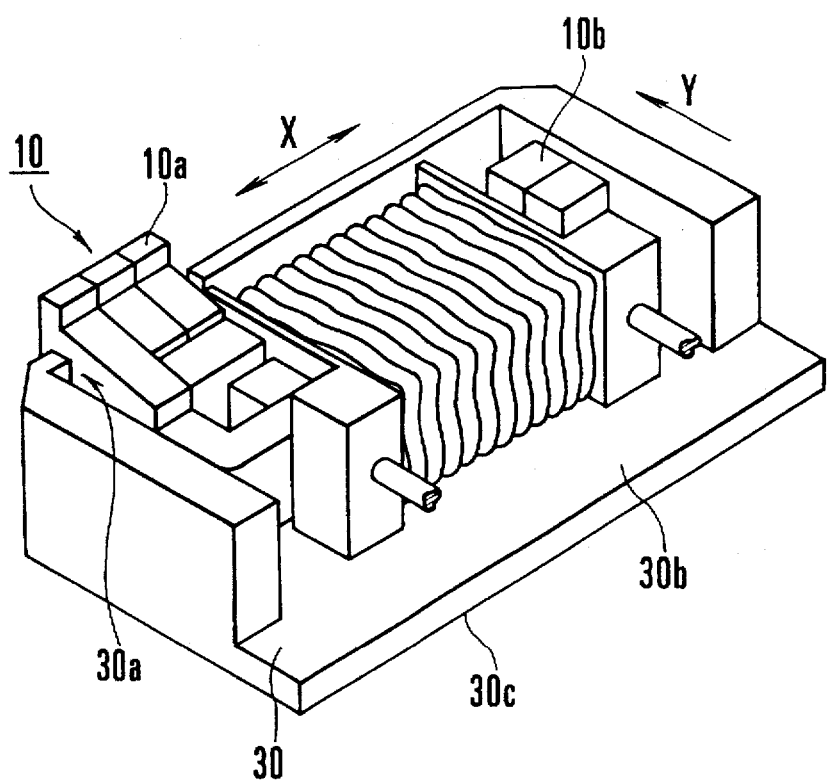
FIG. 6 is a schematic perspective view showing the core half fixed to a core holder.

As shown in FIG. 6, the core half 10 having the coil bobbin 4 wound in the above-described manner is temporarily secured to a core holder 30, as by an instantaneous adhesive. When the core half 10 is placed in this state, a bent portion 10d (refer to FIG. 4) of the core half 10 is made to engage with an engaging groove 30a formed in the core holder 30, thereby restraining the core half 10 from moving in the direction of an arrow X with respect to the core holder 30. In addition, an end portion 10e (refer to FIG. 4) of the core half 10 is made to abut on a projection (not shown) provided on a bottom portion 30b of the core holder 30, thereby restraining the core half 10 from moving in the direction of an arrow Y. After the core half 10 has been assembled in the above-described manner, the joining faces 10a and 10b are subjected to surface grinding so that they can be made flush with each other with respect to a bottom face 30c of the core holder 30.

Figure 5B:
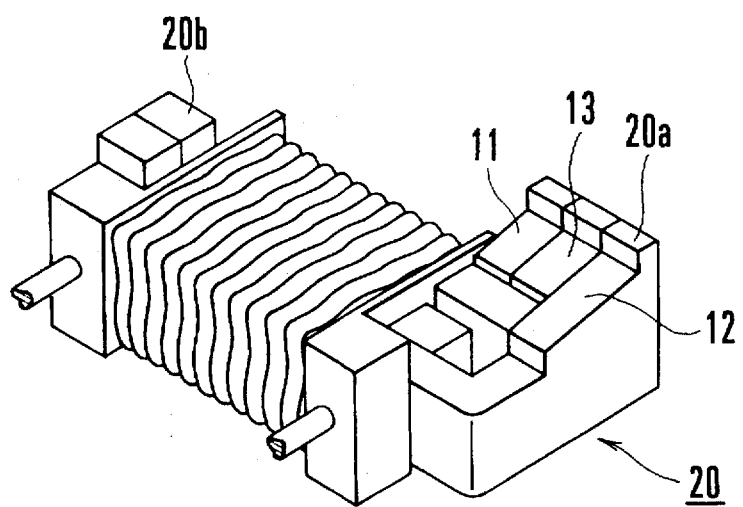

Similarly to the core half 10, the coil half 20 shown in FIG. 5(b) is fixed to a core holder (not shown) and joining faces 20a and 20b are subjected to surface grinding so that the joining faces 20a and 20b can be made flush with each other.

Figure 7:
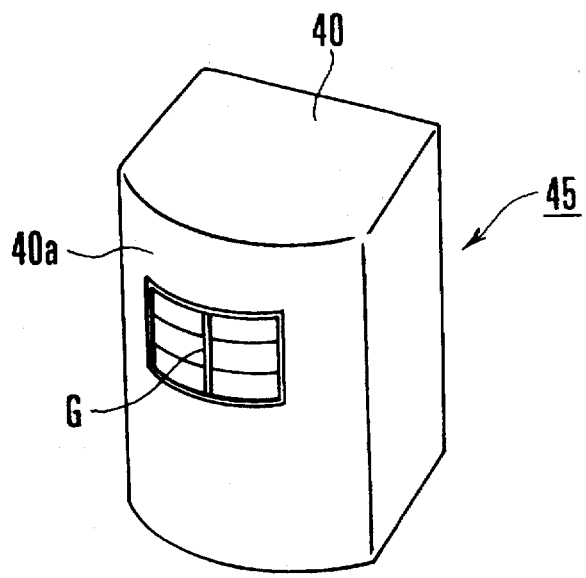
FIG. 7 is a schematic perspective view showing a magnetic head using a magnetic core according to the present embodiment.

The core halves 10 and 20 which are fixed to the respective core holders are joined together, with the joining faces 10a and 10b abutting on the corresponding joining faces 20a and 20b. The gap formed between the joining faces 10a and 20a at this time constitutes a magnetic gap G (refer to FIG. 7). The joined core halves 10 and 20 are inserted into the stainless-steel case 40 shown in FIG. 7 so that the magnetic gap G can be exposed at a recording-medium sliding face 40a, and the case 40 is charged with a resin fixing material to fix the joined core halves 10 and 20 in the case 40. Then, the recording-medium sliding face 40a is ground into an arcuate shape in cross section, thereby finishing a magnetic head 45.

In the arrangement and construction of the magnetic core (core half) according to the present embodiment, since the core element 3 having no coil winding portion is sandwiched between the core elements 1 and 2 each having the coil winding portion, $l_3 < l_2$ is attained. In addition, the core elements 1, 2 and 3 are laminated in such a way that the engaging projection 3a of the sandwiched core element 3 is engaged with the engaging groove 1e of the sandwiching core element 1, whereby the size of the magnetic core can be reduced.

Figure 8:
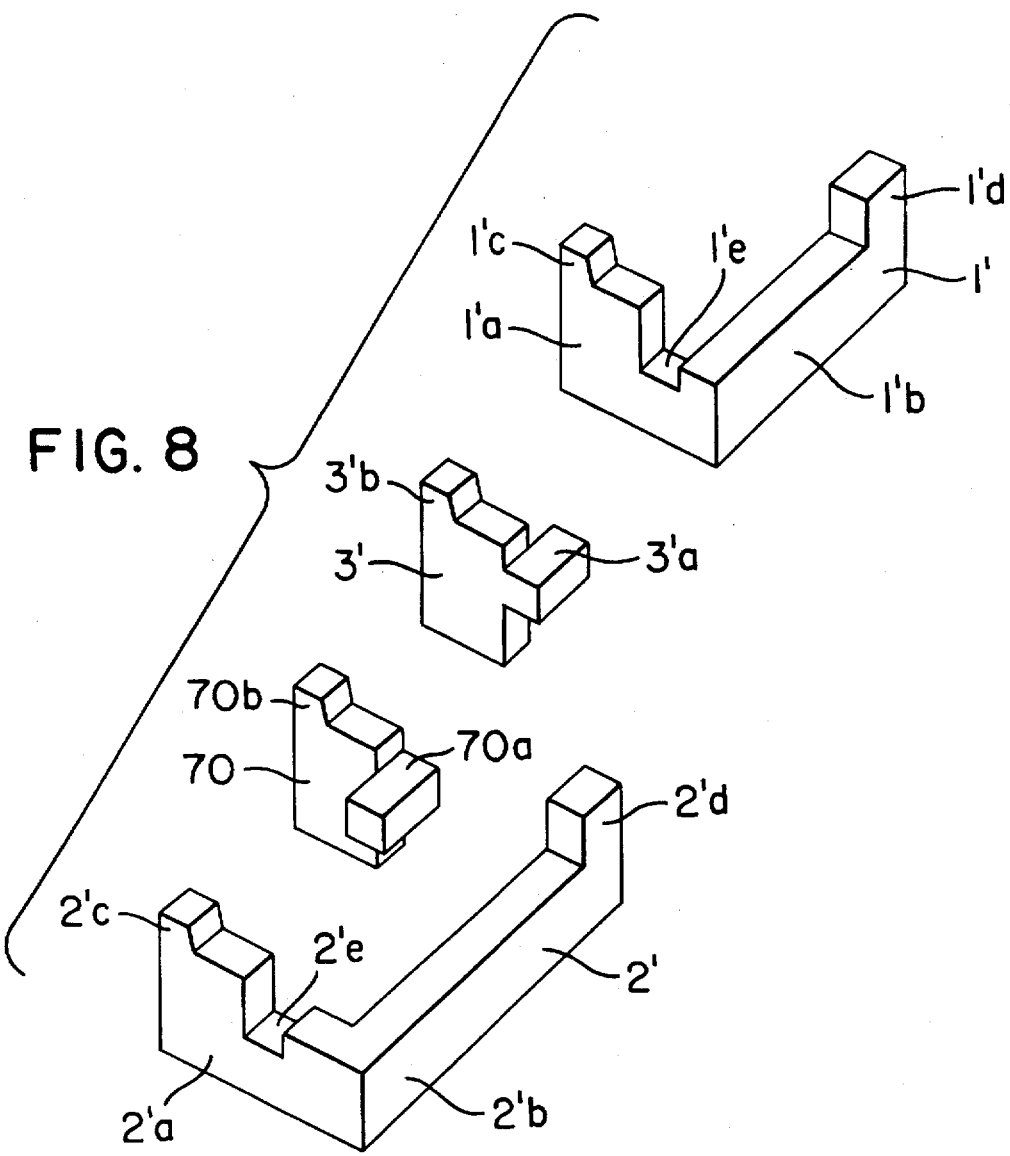
FIG. 8 is schematic perspective view showing in exploded form core elements which constitute a core half according to another embodiment of the present invention.
Figure 9:
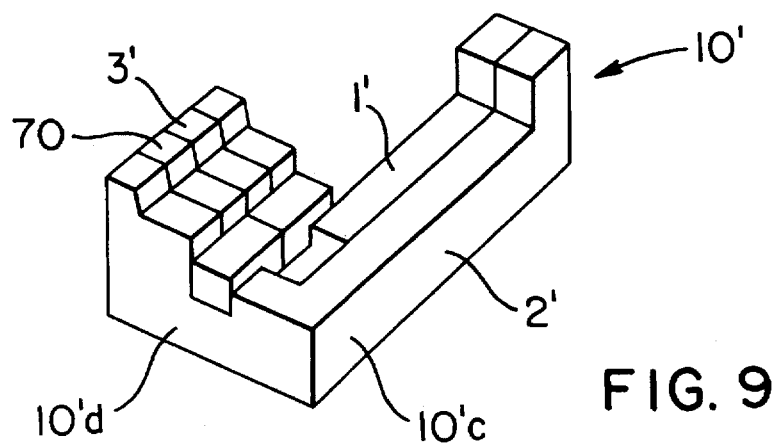
FIG. 9 is a schematic perspective view showing the FIG. 8 core elements in laminated form.

In the above description of the embodiment, reference has been made to an example in which a core half includes two L-shaped core elements and one I-shaped core element sandwiched therebetween. However, two I-shaped cores may be sandwiched between the L-shaped core elements. In this case, in the arrangement shown in FIG. 3, another engaging groove may be formed in the core element 2. This arrangement is shown in FIGS. 8 and 9, where the elements carried over from FIGS. 3 and 4 are repeated with prime (') indications. The second I-shaped core element is shown at 70, having engaging projection 70a, which serves as an engaging projection, and a further projection 70b. The engaging projection 70 seats in engaging groove 23 e formed in core element 2'. It is also possible to adopt an arrangement having more than two I-shaped core elements engaged with one another. In this case, it is possible to further reduce the size of the magnetic core compared to a similar arrangement using L-shaped core elements in place of such I-shaped core elements. Furthermore, it is also possible to adopt an arrangement in which more than two L-shaped core elements are provided and I-shaped core elements are sandwiched between the adjacent ones of the L-shaped core elements. Even in the case of such arrangement, it is possible to reduce the size of the magnetic core compared to an arrangement using only L-shaped core elements.

Also, the coil bobbin 4 may be provided on either of the core halves 10 or 20.

As is apparent from the foregoing description, according to the present embodiment, it is possible to reduce the size of a magnetic head including a magnetic core in which core halves are joined together and each of the core halves has a plurality of core elements in laminated form.

Also, since the coil winding portion of the magnetic core can be made small (thin), the coil bobbin can be made small.

Further, since the engaging portion is formed in the I-shaped core element, the lamination strength with which the core elements are laminated can be increased, so that the I-shaped core element is prevented from easily coming away from the core half.

What is claimed is:

1. A magnetic core comprising core halves which are joined together and each of which includes a plurality of core elements in laminated form, wherein each of said core hales includes:

(a) a plurality of L-shaped core elements each having a first base portion and a second base portion, said plurality of L-shaped core elements being joined together at said respective second base portions;

(b) an I-shaped core element provided between said plurality of L-shaped core elements in such a manner as to be interposed between said respective first base portions; and (c) one of the L-shaped core elements having a notch near the first base portion, the I-shaped core element having a first base portion and a second base portion with a protrusion, wherein the first base portion of the I-shaped core element is provided between the first base portions of the plurality of L-shaped core elements and the protrusion of the I-shaped core element is inserted into he notch of the L-shaped core element thereby reducing the length of the magnetic core in the gap depth direction.

2. A magnetic core according to claim 1, wherein said second base portions of said plurality of L-shaped core elements are respectively formed as coil winding portions.

3. A magnetic core according to claim 1, wherein said I-shaped core element provided between said plurality of L-shaped core elements is one in number.

4. A magnetic core according to claims 1 or 3 wherein each of said L-shaped and I-shaped core elements is made of a nickel-iron alloy.

5. A magnetic core according to claim 1, wherein said I-shaped core element provided between said plurality of L-shaped core elements is plural in number.

6. A magnetic core according to claim 5 wherein each of said L-shaped and I-shaped core elements is made of a nickel-iron alloy.

7. A magnetic core according to claim 1, wherein said core defines a magnetic gap, said gap being bounded on each side thereof by said first base portions of said L-shaped core elements and said I-shaped, first base portion of said core element.

8. A magnetic head comprising:

(a) a magnetic core including core halves joined together, each of said core halves including a plurality of core elements in laminated form, each of said core halves having:

a plurality of L-shaped core elements each provided with a first base portion and second base portion, said plurality of L-shaped core elements being joined together at said respective second base portion;

an I-shaped core element provided between said plurality of L-shaped core elements in such a manner as to be interposed between said respective first base portions; and one of the L-shaped core elements having a notch near the first base portion, the I-shaped core element having a first base portion, and a second base portion with a protrusion, wherein the first base portion of the I-shaped core element is provided between the first base portions of the plurality of I-shaped core elements and the protrusion of the I-shaped core element is inserted into the notch of the L-shaped core element thereby reducing the length of the magnetic core in the gap depth direction;

(b) coils, each of which is wound around said second base portions at which said plurality of L-shaped core elements are joined together; and (c) a case in which said magnetic core and said coils are accommodated.

9. A magnetic head according to claim 8, further comprising a holder for holding said magnetic core.

10. A magnetic head according to claim 8, wherein each of said coils is wound around said second base portions, of said L-shaped core elements via a bobbin.

11. A magnetic head according to claim 8, wherein said I-shaped core element provided between said plurality of L-shaped core elements is one in number.

12. A magnetic core according to claims 8 or 11, wherein each of said L-shaped and I-shaped core elements is made of a nickel-iron alloy.

13. A magnetic head according to claim 12, wherein said case is made of stainless steel.

14. A magnetic head according to claim 8, wherein said I-shaped core element provided between said plurality of L-shaped core elements is plural in number.

15. A magnetic head according to claim 14 wherein each of said L-shaped and I-shaped core elements is made of a nickel-iron alloy.

16. A magnetic core according to claim 8, wherein said core defines a magnetic gap, said gap being bounded on each side thereof by said first base portions of said L-shaped core elements and said I-shaped first base portion of said core element.

17. A magnetic head comprising first and second core halves which are joined together, wherein each of said core halves includes:

(a) a plurality of L-shaped core elements each having a first base portion and a second base portion, said plurality of L-shaped core elements being joined together at said respective second base portions;

(b) an I-shaped core elements provided between said plurality of L-shaped core elements in such a manner as to be interposed between said respective fist base portions;

(c) one of the L-shaped core elements having a notch near the first base portion, the I-shaped core element having a first base portion, and a second base portion with a protrusion, wherein he first base portion of the I-shaped core element is provided between the first base portions of the plurality of L-shaped core elements and the protrusion of the I-shaped core element is inserted into he notch of the L-shaped core element thereby reducing the length of the magnetic core in the gap depth direction; and (d) a common winding wound around said second base portions of said L-shaped core elements but not around said I-shaped core element.

* * * * *

UNITED STATES PATENT AND TRADEMARK OFFICE
CERTIFICATE OF CORRECTION

PATENT NO. : 5,764,452

DATED : June 9, 1998

INVENTOR(S) : Masakazu Sodeyama

It is certified that error appears in the above-identified patent and that said Letters Patent is hereby corrected as shown below:

Col. 1, line 32, delete "-".
Col. 4, line 7, delete "FGIS." and insert -- FIGS. --.
Col. 4, line 11, delete "23e" and insert -- 2'e --.
Col. 4, line 59, delete "he" and insert -- the --.
Col. 5, line 13, delete "I-shaped, first base portion of said" and insert --first base portion of said I-shaped --.
Col. 5, line 22, after "and" insert -- a --.
Col. 6, line 19, delete "I-shaped first base portion of said" and insert --first base portion of said I-shaped --.
Col. 6, line 31, delete "fist" and insert -- first --.
Col. 6, line 37, delete "he" and insert -- the --.
Col. 6, line 41, delete "he" and insert -- the --.

Signed and Sealed this

Twenty-ninth Day of December, 1998

Attest:

BRUCE LEHMAN

Attesting Officer

Commissioner of Patents and Trademarks